No. 857,958. PATENTED JUNE 25, 1907.
A. L. MUREN.
CHANGEABLE SPEED GEARING.
APPLICATION FILED AUG. 20, 1906.
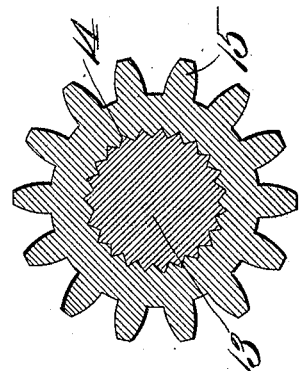
Fig. II.
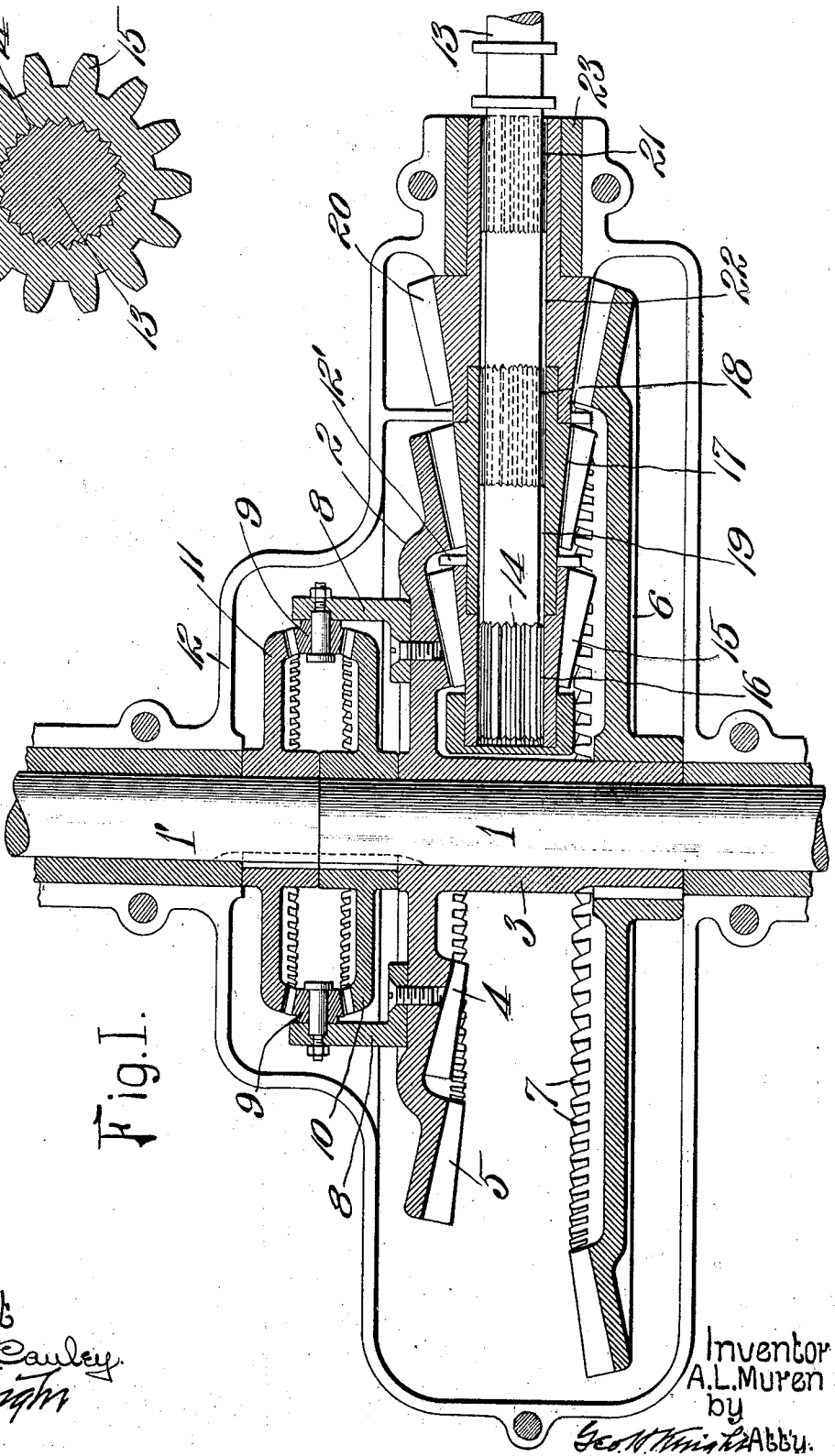
Fig. I.
Attest
A. J. McCauley.
E. S. Knight.
Inventor
A. L. Muren
by
Geo. N. Knight Abbu.

UNITED STATES PATENT OFFICE.

ALBERT L. MUREN, OF BELLEVILLE, ILLINOIS.

CHANGEABLE-SPEED GEARING.

No. 857,958. Specification of Letters Patent. Patented June 25, 1907.

Application filed August 20, 1906. Serial No. 331,261.

*To all whom it may concern:*

Be it known that I, ALBERT L. MUREN, a citizen of the United States of America, residing in Belleville, in the county of St. Clair and State of Illinois, have invented certain new and useful Improvements in Changeable-Speed Gearings, of which the following is a full, clear, and exact description, reference being had to the accompanying drawings, forming part of this specification.

My invention relates to that class of gearings utilized for driving shafts at varied degrees of speed, the present gearing being intended more particularly for use in driving the axles of motor vehicles.

Figure I is a section taken through my gearing. Fig. II is a cross section taken through the driving shaft of the gearing and one of the pinions loosely fitted to and adapted to be driven by said shaft.

1 and 1' designate the sections of a sectional driven shaft and which may in the use of the gearing in a motor vehicle be in the form of an axle of said vehicle.

2 designates a main driving gear wheel loosely mounted upon the driven shaft section 1 and having a hub sleeve 3. The gear wheel 2 is provided at one side with an inner circular gear face 4 and an outer circular gear face 5 with which parts to be hereinafter described coöperate.

6 is a reversing gear wheel that is fixed to the hub sleeve of the main driving gear wheel 2 and which is provided at its side facing the main driving gear wheel with a gear face 7.

8 designates arms carried by the main driving gear wheel 2 and 9 are pinions journaled to these arms.

10 and 11 are transmission gear wheels keyed respectively to the shaft sections 1 and 1' and the teeth of which face each other and mesh correspondingly with the pinions 9 which are located between said transmission gear wheels.

12 designates a housing surrounding the sectional driven shaft and the gearing members hereinbefore mentioned.

13 designates a driving shaft that extends into the housing 12 and is arranged at approximately a right angle to the driven shaft of the gearing. This driving shaft is provided with circumferential teeth 14, preferably located at or adjacent to its end which is located within the gearing housing, in order that said shaft may be placed in driving engagement with either of a series of pinions that will now be described.

15 designates an inner or high speed pinion which is arranged in mesh with the inner circular gear face 4 of the main driving gear wheel 2, this pinion being provided at 16 with internal teeth that are adapted to be engaged by the teeth 14 of the driving shaft 13 when said teeth are moved into a position within said pinions.

17 is an intermediate or slow speed pinion that is arranged in mesh with the circular gear face 5 of the main driving gear wheel 2. This slow speed pinion is provided interiorly at 18 with teeth that are adapted to be engaged by the teeth 14 of the driving shaft when said shaft is moved to bring its teeth thereto, and the pinion is provided with an untoothed portion 19 located between its internal teeth and the toothed portion of the high speed pinion 15, into which the teeth of the driving shaft may be moved, in order that said teeth may occupy a neutral position and the driving shaft be rendered inoperative to drive either of said pinions.

20 designates a reversing pinion which, like the high and slow speed pinions 15 and 17, surrounds the driving shaft 13 but which instead of being arranged in engagement with the main driving gear wheel 2, is arranged in engagement with the reversing gear wheel 7. The reversing pinion 20 is provided at 21 with internal teeth that are adapted to receive the engagement of the circumferential teeth 14 of the driving shaft 13, the teeth in said pinion being located sufficiently remote from the teeth in the slow speed pinion 17 to provide an untoothed portion 22 within which the teeth of the driving shaft may operate without said shaft being operative to drive either of the pinions.

For the purpose of supporting the several pinions 15, 17 and 20 of my gearing, the pinion 20 is provided with a spindle portion which is located within a journal bearing 23 that is mounted in the housing 12, the pinion 17 is provided with a spindle portion which enters into the pinion 20 and also with a spindle portion which enters into the pinion 15. The pinions are further supported by webs or supporting members 12' that are formed integral with or rigidly connected to the housing 12 and in which the pinions 17 and 20 are seated.

In the practical use of my gearing, the driving shaft 13 is shifted either inwardly or outwardly for the purpose of changing the speed of the gearing and it is obvious that when the teeth 14 of said shaft are arranged in engagement with the internal teeth of the high speed pinion 15, said pinion will be driven by said shaft with the result of imparting motion to the main driving gear wheel 2 to cause said wheel to impart rotation to the sectional driven shaft due to its coöperation with the transmission gear wheels 10 and 11; it is also obvious that when the teeth of the driving shaft are brought into engagement with the slow speed pinion 17, the main driving wheel 2 will be driven at a slow speed and that when the teeth of the driving shaft are moved into engagement with the reversing pinion 20 said reversing pinion will be driven to in turn drive the reversing gear wheel 7 and cause said reversing gear wheel to operate the main driving gear wheel 2 and the transmission gear wheels with which said main driving gear wheel coöperates.

I claim:—

1. In a changeable speed gearing, the combination of a driven shaft, a driving gear wheel mounted on said shaft and having gear faces, a plurality of pinions arranged to coöperate individually with the gear faces of said gear wheel, a reversing gear wheel having fixed connection with said first mentioned gear wheel, a pinion associated with said first named pinions and coöperating with said reversing gear wheel, and a shiftable driving shaft arranged to engage either of said pinions for driving action, substantially as set forth.

2. In a changeable speed gearing, the combination of a driven shaft, a driving gear wheel mounted on said shaft and having gear faces, a plurality of pinions arranged to coöperate individually with the gear faces of said gear wheel, a reversing gear wheel having fixed connection with said first mentioned gear wheel, a pinion associated with said first named pinions and coöperating with said reversing gear wheel, and a shiftable driving shaft arranged to engage either of said pinions for driving action; said pinions being provided with internal teeth and said driving shaft being provided with external teeth, substantially as set forth.

ALBERT L. MUREN.

In presence of—
E. G. HEINZELMAN,
JAMES P. RICH.